United States Patent
Zhu

(10) Patent No.: US 10,606,273 B2
(45) Date of Patent: Mar. 31, 2020

(54) SYSTEM AND METHOD FOR TRAJECTORY RE-PLANNING OF AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 348 days.

(21) Appl. No.: 15/492,391

(22) Filed: Apr. 20, 2017

(65) Prior Publication Data

US 2018/0307233 A1    Oct. 25, 2018

(51) Int. Cl.
*G05D 1/02* (2006.01)
*G01C 21/34* (2006.01)

(52) U.S. Cl.
CPC ....... *G05D 1/0212* (2013.01); *G01C 21/3415* (2013.01); *G05D 2201/0213* (2013.01)

(58) Field of Classification Search
CPC ......... G05D 1/0212; G05D 2201/0213; G05D 1/0221; G05D 1/0223; G01C 21/3415
USPC ............................................. 701/26
See application file for complete search history.

(56) References Cited

U.S. PATENT DOCUMENTS

| | | | | |
|---|---|---|---|---|
| 2007/0112461 | A1* | 5/2007 | Zini ................ | G05B 19/41895 700/245 |
| 2018/0246515 | A1* | 8/2018 | Iwama ................. | B60R 11/04 |

* cited by examiner

*Primary Examiner* — Paula L Schneider
(74) *Attorney, Agent, or Firm* — Womble Bond Dickinson (US) LLP

(57) ABSTRACT

According to one embodiment, a replanning determination mechanism is utilized to determine whether an ADV needs replanning of the route or trajectory based on the driving status and conditions of the ADV at the point in time, such as, for example, the difference between the planned position and the actual position, difference between a current speed and a target speed, and a difference between a current heading direction and a target heading direction. Such differences as a whole represents an error between the planning and the actual response from the ADV. If the error is greater than a predetermined threshold, replanning may be performed; otherwise, a regular planning is performed.

24 Claims, 9 Drawing Sheets

SYSTEM AND METHOD FOR TRAJECTORY RE-PLANNING OF AUTONOMOUS DRIVING VEHICLES

TECHNICAL FIELD

Embodiments of the present invention relate generally to operating autonomous vehicles. More particularly, embodiments of the invention relate to trajectory re-planning of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. When planning operations of an autonomous driving vehicle (ADV), the goal is to plan a route or trajectory and to control the ADV to follow the planed route or trajectory as close as possible. However, due to a variety of factors of driving circumstances, sometimes the ADV may not be able to follow the planned route or trajectory as close as expected. In such situation, a replanning of the route or trajectory may be needed. It is difficult to determine whether the replanning or regular planning should be performed under the driving environment at the point in time.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
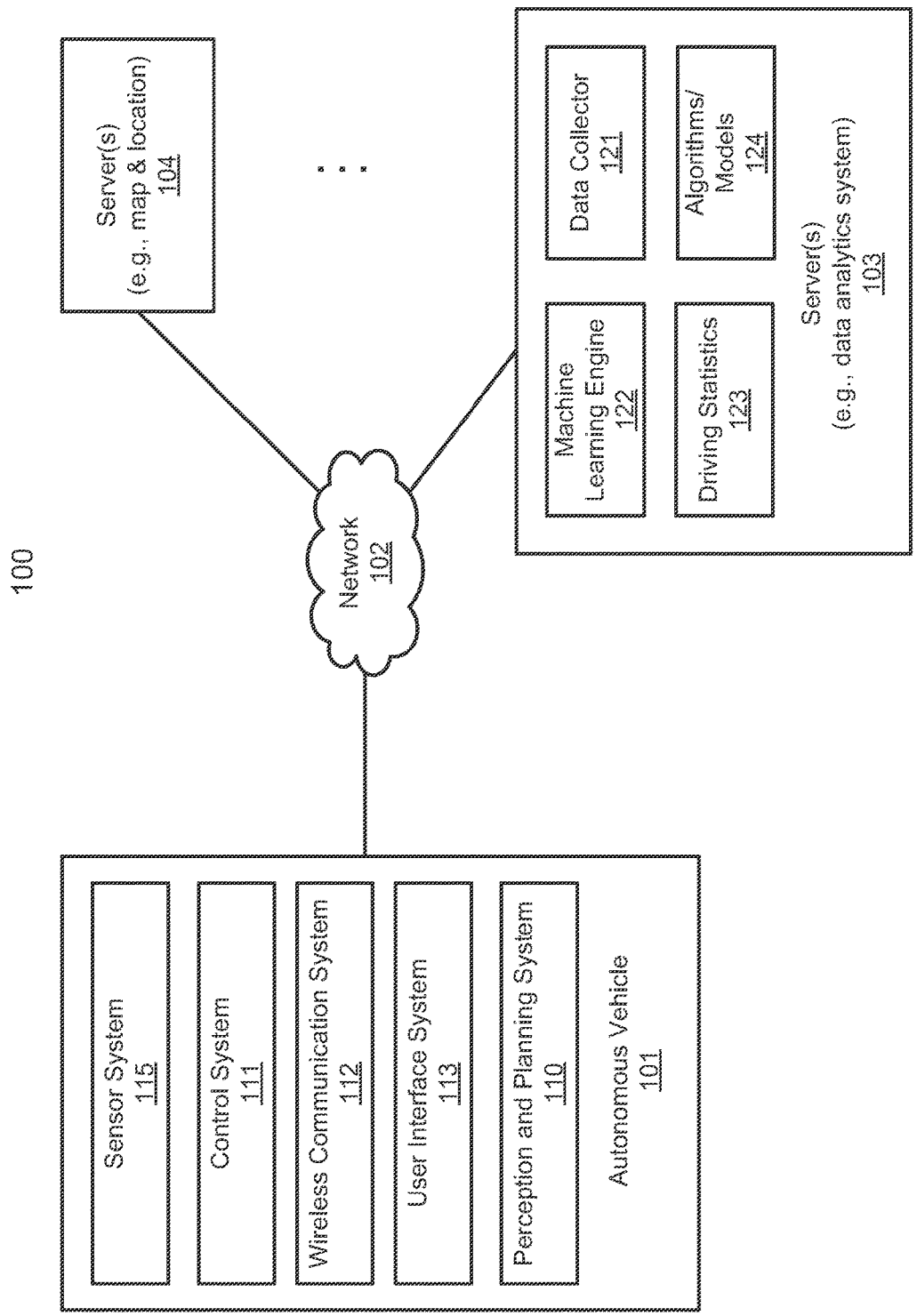
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a replanning determination mechanism is utilized to determine whether an ADV needs replanning of the route or trajectory based on the driving status and conditions of the ADV at the point in time, such as, for example, the difference between the planned position and the actual position, difference between a current speed and a target speed, and a difference between a current heading direction and a target heading direction. Such differences as a whole represents an error between the planning and the actual response from the ADV. If the error is greater than a predetermined threshold, replanning may be performed; otherwise, a regular planning is performed.

During regular planning, a planning module performs the planning of a current planning cycle for a next route segment based on a target state (e.g., expected state) of the ADV (e.g., target position, target speed, target heading direction) of a previous planning cycle. A control module generates and issues control commands based on the planning and control data provided by the planning module. During replanning, the planning of a current planning cycle is based on the actual state of the ADV (e.g., actual speed, actual position, actual heading direction) instead of the target state of the ADV for the next route segment.

According to one embodiment, a state difference is determined between a current state of an ADV and a target state of the ADV while the ADV is moving along a route as planned. A state trend of a current state is determined in view of a previous state of the ADV, where the state trend represents a trend of changes of a difference between the current state and the previous state. A state of the ADV includes at least a position of the ADV, a speed of the ADV, and/or a heading direction of the ADV. A replanning score is calculated based on the state difference and the state trend using a replanning scoring function. The state difference may include a distance difference between a current position and a target position of the ADV, a speed difference between a current speed and a target speed of the ADV, and/or a direction difference between a current heading direction and a target heading direction of the ADV. In one embodiment, the replanning score is calculated further based on the current speed of the ADV and/or a curvature of the route. If the replanning score is greater than a predetermined threshold, replanning of a next route segment of the route is performed. Otherwise, if the replanning score is below or equal to the predetermined threshold, regular planning is performed.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
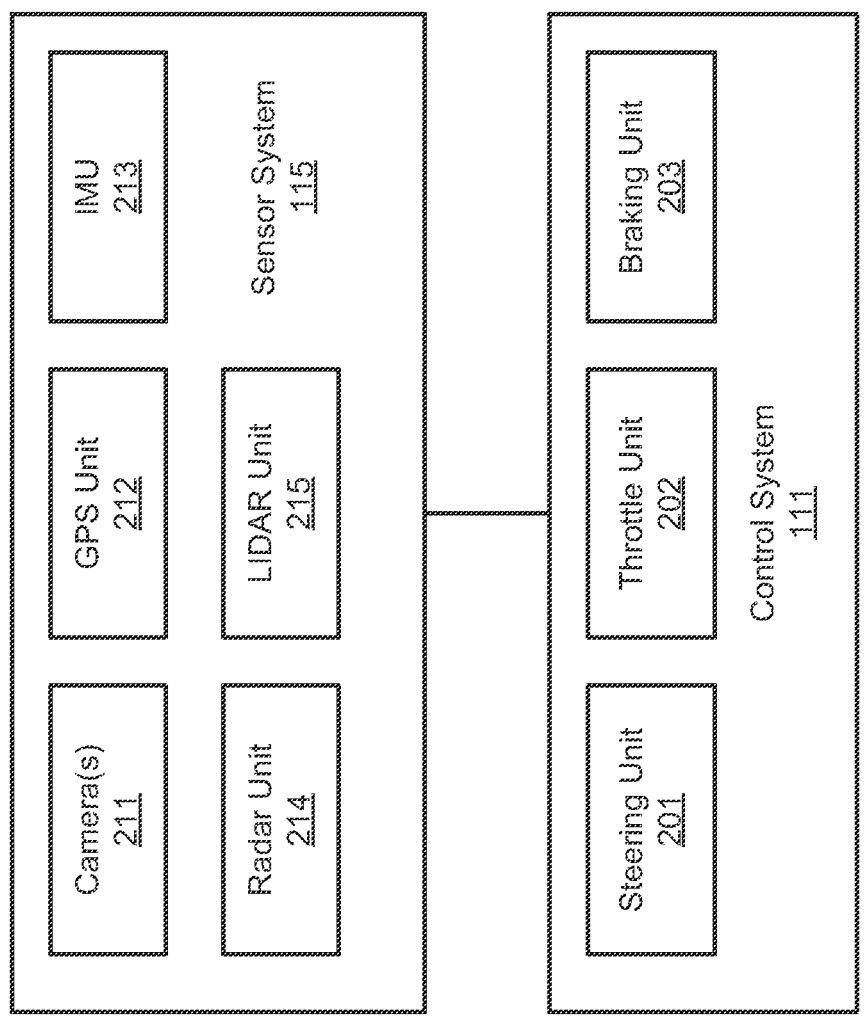
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include an algorithm to calculate a replanning score based on a variety of factors, such as, for example, a distance difference between a current position and a target position, a speed difference between a current speed and a target speed, and a direction difference between a current heading direction and a target heading direction, etc. Algorithms 124 may further include specific scoring functions to calculating a score representing each of the distance difference, the speed difference, and the direction difference. These scores may be utilized by the replanning scoring function to calculate a final replanning score. Algorithms 124 may further include a score threshold that is utilized to determine whether replanning should be performed in view of a particular replanning score. These scoring functions and the thresholds may be specifically associated with a particular type or types of ADVs. That is, different types of ADVs may be associated with different scoring functions and thresholds. The scoring functions and thresholds may be uploaded to the ADVs to be utilized in real-time.

Figure 3:
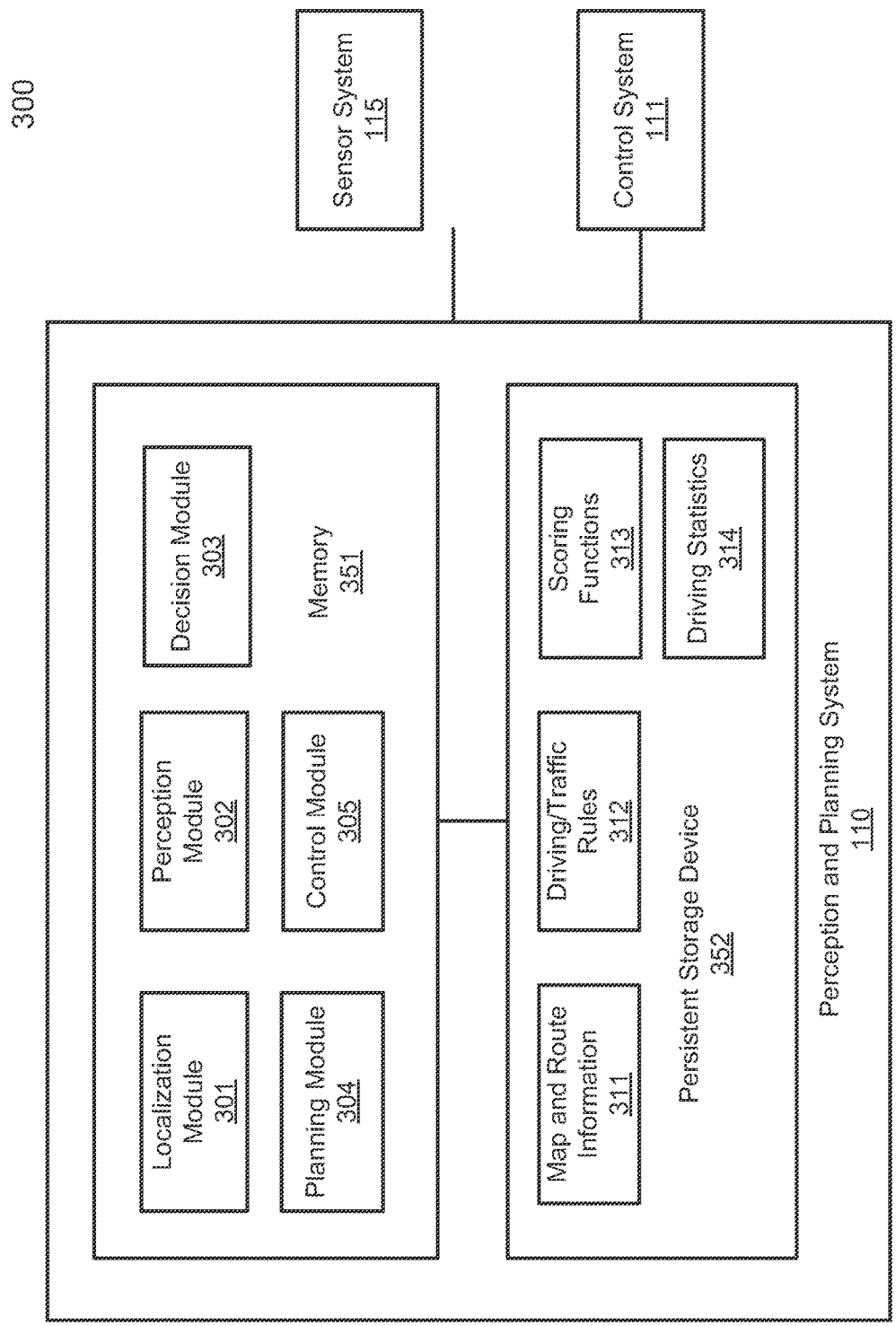
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304 and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, planning module 304 is configured to determine whether an ADV needs replanning of the route or trajectory based on the driving state and conditions of the ADV at the point in time, such as, for example, the difference between the planned position and the actual position, difference between a current speed and a target speed, and the difference between a current heading direction and a target heading direction. Such differences as a whole represents an error between the planning and the actual response from the ADV. If the error is greater than a predetermined threshold, replanning may be performed by planning module 304; otherwise, a regular planning is performed.

During regular planning, planning module 304 performs the planning of a current planning cycle for a next route segment based on a target state (e.g., expected state) of the ADV (e.g., target position, target speed, target heading direction) of a previous planning cycle. Control module 305 generates and issues control commands based on the planning and control data provided by planning module 304. During replanning, the planning of a current planning cycle is based on the actual state of the ADV (e.g., actual speed, actual position, actual heading direction) for the next route segment.

According to one embodiment, planning module 304 determines a state difference between a current state of an ADV and a target state of the ADV while the ADV is moving along a route as planned. The planning module 304 further determines a state trend of a current state in view of a previous state of the ADV based on driving statistics 314 of the ADV. The state trend represents a trend of changes (e.g., increasing or decreasing) of the difference between the current state and the previous state. A state of the ADV includes at least a position of the ADV, a speed of the ADV, and/or a heading direction of the ADV. The planning module 304 calculates a replanning score based on the state difference and the state trend using replanning scoring function(s) 313. Reaplanning scoring function(s) 313 may be generated as part of algorithms 124.

The state difference may include a distance difference (also referred to as a position difference) between a current position and a target position of the ADV, a speed difference between a current speed and a target speed of the ADV, and/or a direction difference between a current heading direction and a target heading direction of the ADV. In one embodiment, planning module 304 calculates the replanning score further based on the current speed of the ADV and/or a curvature of the route. If the replanning score is greater than a predetermined threshold, planning module 304 performs replanning of a next route segment of the route. Otherwise, if the replanning score is below or equal to the predetermined threshold, planning module 304 performs regular planning.

Figure 4:
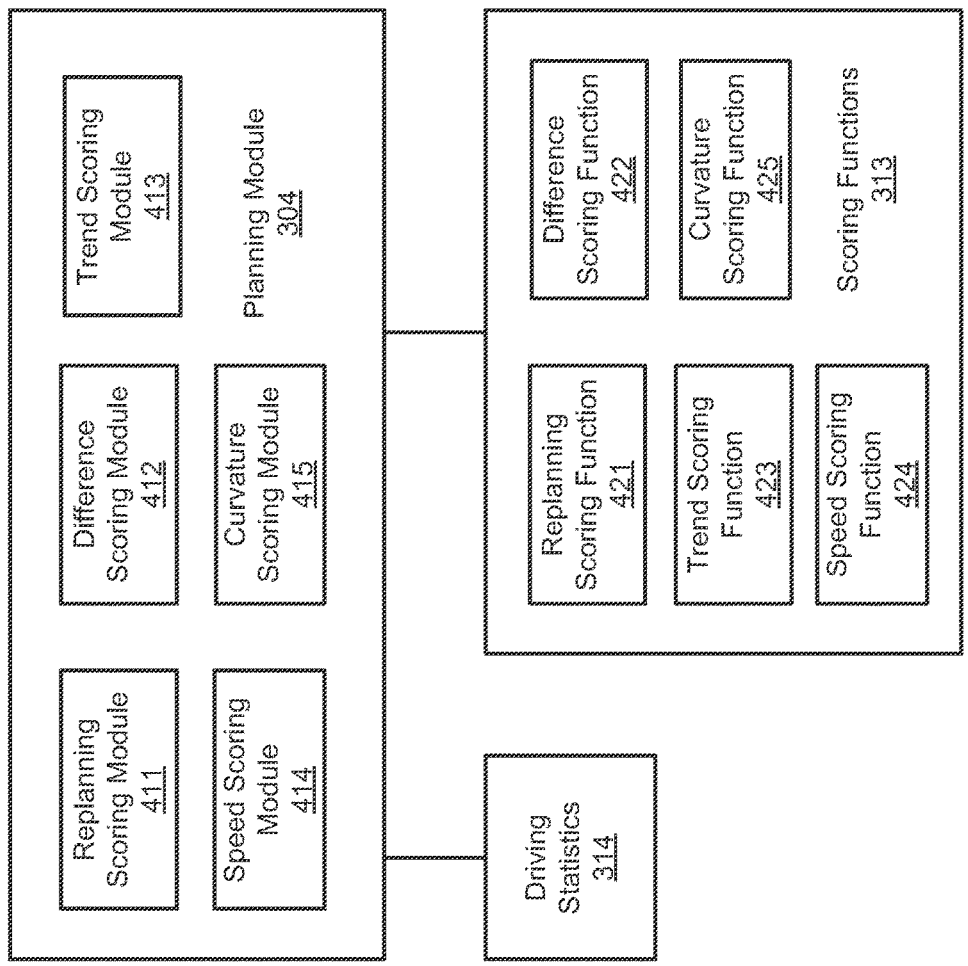
FIG. 4 is a block diagram illustrating an example of a planning module according to one embodiment of the invention.

FIG. 4 is a block diagram illustrating an example of a planning module according to one embodiment of the invention. Referring to FIG. 4, planning module 304 includes replanning scoring module 411, difference scoring module 412, trend scoring module 413, speed scoring module 414, and curvature scoring module 415. Note that some or all of these scoring modules 411-415 may be integrated into fewer scoring modules or a single scoring module. Scoring modules 411-415 calculate various scores using at least some of scoring functions 313. In one embodiment, scoring functions 313 include replanning scoring function 421, difference scoring function 422, trend scoring function 423, speed scoring function 424, and curvature scoring function 425.

Figure 5:
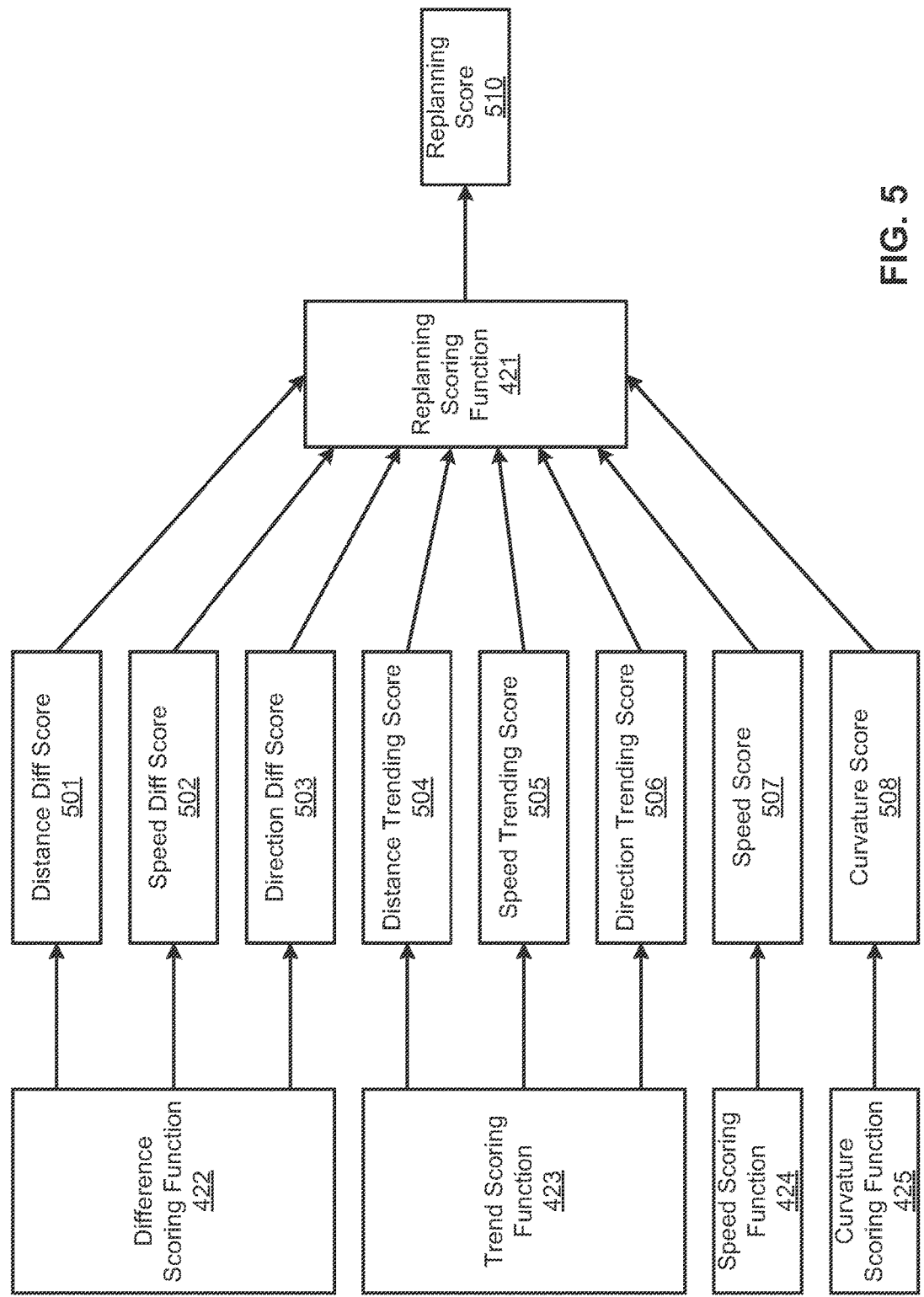
FIG. 5 is a processing flow diagram illustrating a process for generating a replanning score according to one embodiment of the invention.

Referring now to FIG. 4 and FIG. 5, according to one embodiment, difference scoring module 412 is configured to calculate distance or position difference score 501 (referred to as score F1(distance)) based on a difference between a current position of the ADV and a target position of the ADV using difference scoring function 422 (referred to as scoring function F1). The target position of the ADV refers to a target or expected position planned in a previous planning cycle. Difference scoring module 412 further calculates speed difference score 502 (referred to as score F1(speed)) based on a difference between a current speed of the ADV and a target speed of the ADV using difference scoring function 422. The target speed of the ADV refers to a target or expected speed planned in a previous planning cycle. Difference scoring module 412 further calculates direction difference score 503 (referred to as score F1(direction)) based on a difference between a current heading direction of the ADV and a target heading direction of the ADV using difference scoring function 422. The target heading direction of the ADV refers to a target or expected heading direction planned in a previous planning cycle. Note that difference scoring function 422 may include specific or individual scoring functions for calculating distance difference score 501, speed difference score 502, and/or direction difference score 503. Similarly, difference scoring module 412 may include specific or individual scoring modules to perform the calculations.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle (e.g., 100 ms), planning module 304 plans a target position for the current cycle (e.g., next 5 seconds) based on a target position planned in a previous cycle. If the current actual position of the ADV is significantly different from the target position planned by a previous planning cycle, planning module 304 may have to replan the next segment based on the actual position of the ADV instead of the target position of the previous planning cycle. Control module 305 then generates one or more control commands (e.g., throttle, brake, steering control commands) based on the planning and control data of the current cycle.

Referring back to FIGS. 4 and 5, according to one embodiment, trend scoring module 413 is configured to calculate distance trending score 504, referred to as score F2(distance), using trend scoring function 423 (referred to as scoring function F2) in view of driving statistics 314 as part of a driving history. Distance trending score 504 refers to trending of changes of the distance difference. Distance trending score 504 indicates whether the difference is increasing or decreasing in view of the difference calculated in a prior planning cycle. If the difference is increasing, the trending score may be positive; otherwise if the difference is decreasing, the trending score may be negative. Driving statistics 314 include information recording the driving commands and responses from the ADV at different points in time in the past. Driving statistics 314 may record the states of the ADV (e.g., position, speed, heading direction) over a period of time.

Trend scoring module 413 is configured to calculate speed trending score 505, referred to as score F2(speed), using trend scoring function 423 in view of driving statistics 314. Speed trending score 505 refers to trending of changes of the speed difference between a current speed and a target speed of the ADV. Speed trending score 505 indicates whether the difference is increasing or decreasing in view of the difference calculated in a prior planning cycle. Trend scoring module 413 further calculates direction trending score 506, referred to as score F2(direction), using trend scoring function 423 in view of driving statistics 314. Direction trending score 506 refers to trending of changes of the direction difference between a current heading direction and a target heading direction of the ADV. Direction trending score 506 indicates whether the difference is increasing or decreasing in view of the difference calculated in the last planning cycle. Note that trend scoring function 423 may include specific or individual scoring functions for calculating distance trending score 504, speed trending score 505, and/or direction trending score 506. Similarly, trend scoring module 413 may include specific or individual scoring modules to perform the calculations.

In one embodiment, replanning scoring module 411 calculates replanning score 510 using replanning scoring function 421 based on distance difference score 501, speed difference score 502, direction difference score 503 in view of distance trending score 504, speed trending score 505, and direction trending score 506. Each of distance trending score 504, speed trending score 505, and direction trending score 506 can be a positive value or a negative value. If the trend is increasing in view of a previous trend, the corresponding trending score may be positive. If the trend is decreasing in view of the previous trend, the corresponding trending score may be negative. If replanning score 510 is above a predetermined threshold, planning module 304 may perform replanning of the next route segment; otherwise, planning module 304 may perform regular planning.

According to another embodiment, speed scoring module 414 calculates speed score 507 (referred to herein as score F3) based on the current speed of the ADV using speed scoring function 424. Speed score 507 may be higher for a higher speed of the ADV. Replanning scoring module 411 calculates replanning score 510 further based on speed score 507. In one embodiment, higher speed score may lower the overall replanning score 510. The rationale behind it is that one would allow higher tolerance in error if the ADV is traveling in a higher speed.

According to another embodiment, curvature scoring module 415 calculates curvature score 508 (referred to herein as score F4) based on the curvature of the route segment or route using curvature scoring function 425. Curvature score 508 may be higher if the route has a sharper curve. Replanning scoring module 411 calculates replanning score 510 further based on curvature score 508. In one embodiment, higher curvature score may lower the overall replanning score 510. The rationale behind it is that one would allow higher tolerance in error if the ADV is moving in a route with a sharper curve.

According to one embodiment, replanning score 510 may be calculated based on difference scores 501-503, trending scores 504-506, speed score 507, and curvature score 508. In one particular embodiment, replanning score 510 may be calculated as follows:

$$\text{Replanning Score} = [F1(\text{distance})*F2(\text{distance})/F3] + [F1(\text{speed})*F2(\text{speed})/F3] + [F1(\text{curvature})*F2(\text{curvature})/F4]$$

As shown in the above equation, speed core F3 typically affects the distance error and the speed error, while curvature score F4 typically affects the curvature component of the difference score and trending score.

Figure 6:
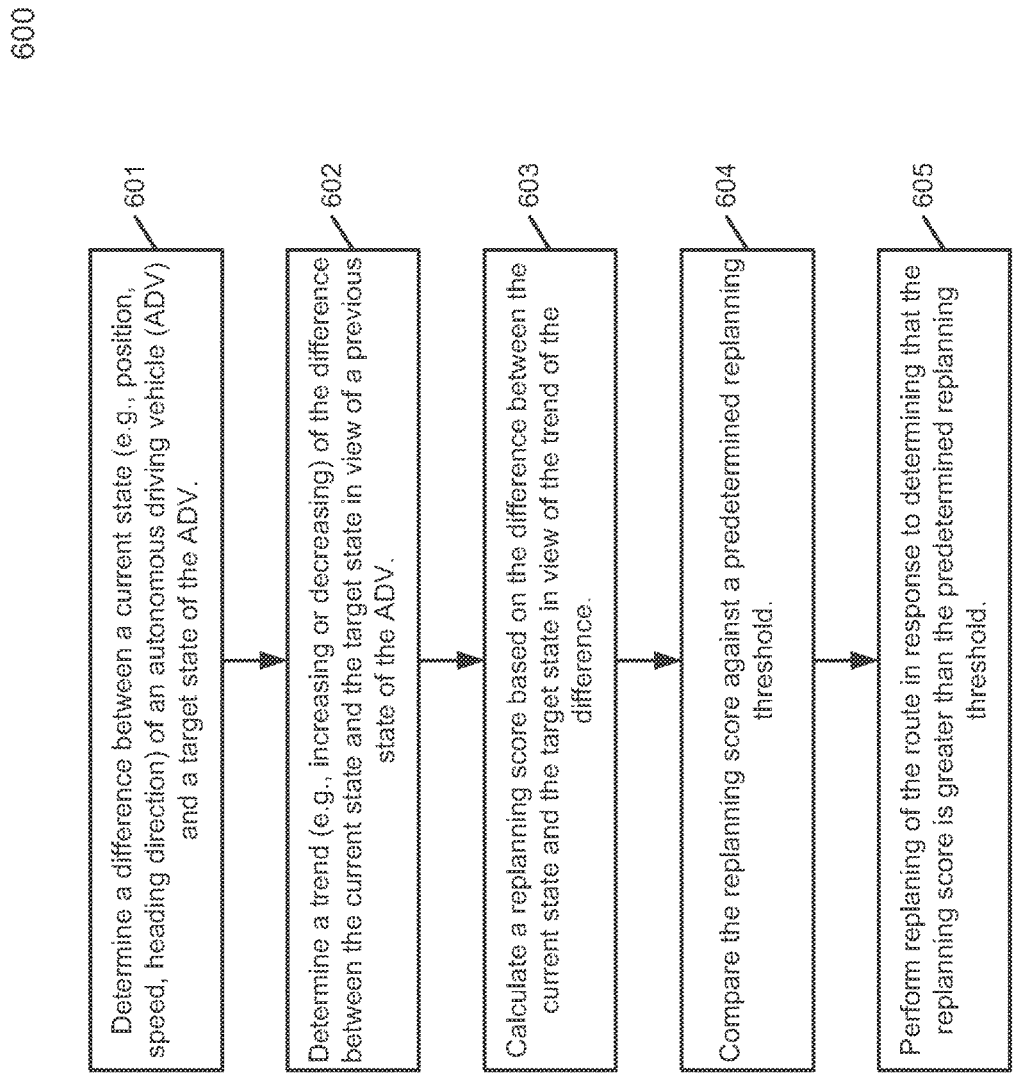
FIG. 6 is a flow diagram illustrating an example of a process for operating an autonomous driving vehicle according to one embodiment of the invention.

FIG. 6 is a flow diagram illustrating a process of operating an autonomous driving vehicle according to one embodiment of the invention. Process 600 may be performed by processing logic which may include software, hardware, or a combination thereof. For example, process 600 may be performed by planning module 304. Referring to FIG. 6, in operation 601, processing logic determines a difference between a current state (e.g., current position, speed, heading direction) of an ADV and a target state (e.g., target position, target speed, target heading direction) of the ADV. A difference score is generated. In one embodiment, the difference score may include a distance difference score, a speed difference score, and a direction difference score as described above.

In operation 602, processing logic determines a trend of the difference between the current state and the target state of the ADV in view of previous state of the ADV, for example, using prior history of driving statistics. A trending score is generated. In one embodiment, the trending score may include a distance trending score, a speed trending score, and a direction trending score as described above. In operation 603, processing logic calculates a replanning score based on the difference score and the trending score. In one embodiment, processing logic optionally determines a speed score based on a current speed of the ADV and/or a curvature score based on the curvature of the route segment or route. The replanning score may be calculated further based on the speed core and/or curvature score. In operation 604, processing logic compares the replanning score against a predetermined threshold. If the replanning score is greater than the predetermined threshold, in operation 605, processing logic performs replanning of the route segment or route; otherwise, regular planning is performed.

Figure 7:
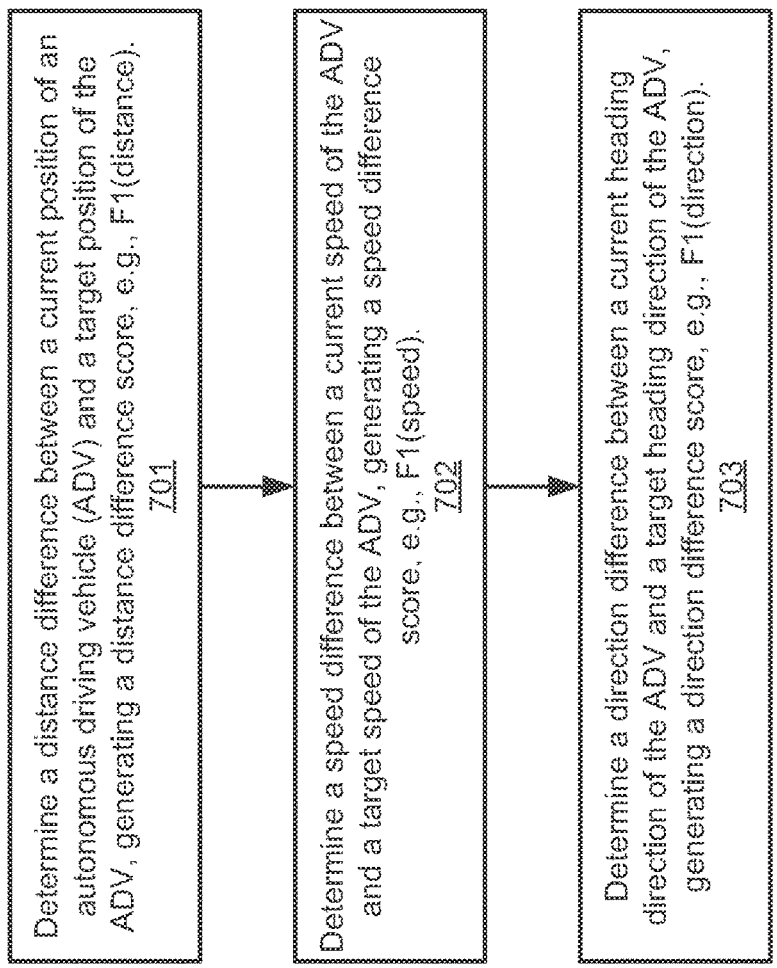
FIG. 7 is a flow diagram illustrating a process of determining difference between a current state and a target state of an autonomous driving vehicle according to one embodiment of the invention.

FIG. 7 is a flow diagram illustrating a process of determining difference between a current state and a target state of an autonomous driving vehicle according to one embodiment of the invention. For example, process 700 may be performed as part of operation 601 of FIG. 6. Referring to FIG. 7, in operation 701, processing logic determines a distance difference between a current position and a target position of an ADV. A distance difference score is optionally generated such as F1(distance) as described above. In operation 702, processing logic determines a speed difference between a current speed and a target speed of the ADV. A speed difference score is optionally generated such as F1(speed) as described above. In operation 703, processing logic determines a direction difference between a current heading direction and a target heading direction of the ADV. A direction difference score is optionally generated such as F1(direction) as described above.

Figure 8:
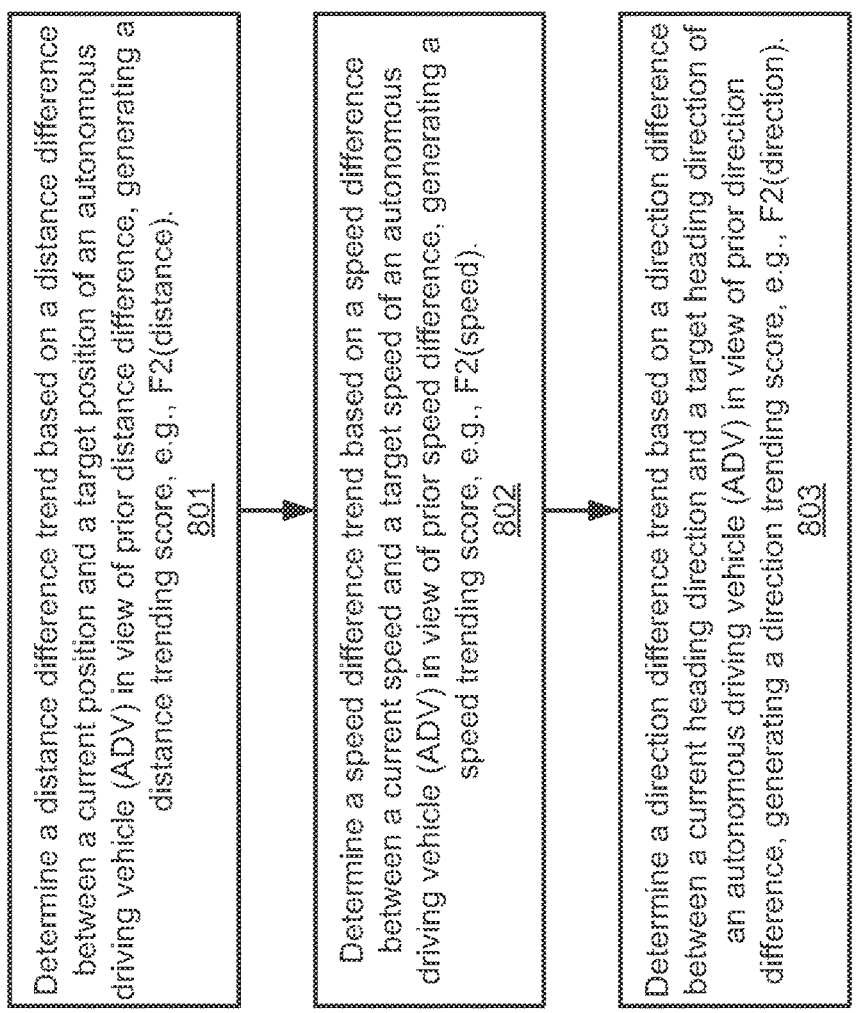
FIG. 8 is a flow diagram illustrating a process of determining a trend of difference between a current state and a target state of an autonomous driving vehicle according to one embodiment of the invention.

FIG. 8 is a flow diagram illustrating a process of determining a trend of difference between a current state and a target state of an autonomous driving vehicle according to one embodiment of the invention. For example, process 800 may be performed as part of operation 602 of FIG. 6. Referring to FIG. 8, in operation 801, processing logic determines a distance difference trend based on a distance difference between a current position and a target position of an ADV in view of a prior distance difference of a prior planning cycle. A distance trending score is optionally generated such as F2(distance) as described above. In operation 802, processing logic determines a speed difference trend based on a speed difference between a current speed and a target speed of the ADV in view of a prior speed difference of a prior planning cycle. A speed trending score is optionally generated such as F2(speed) as described above. In operation 803, processing logic determines a direction difference trend based on a direction difference between a current heading direction and a target heading direction of the ADV in view of a prior direction difference of a prior planning cycle. A direction trending score is optionally generated such as F2(direction) as described above.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
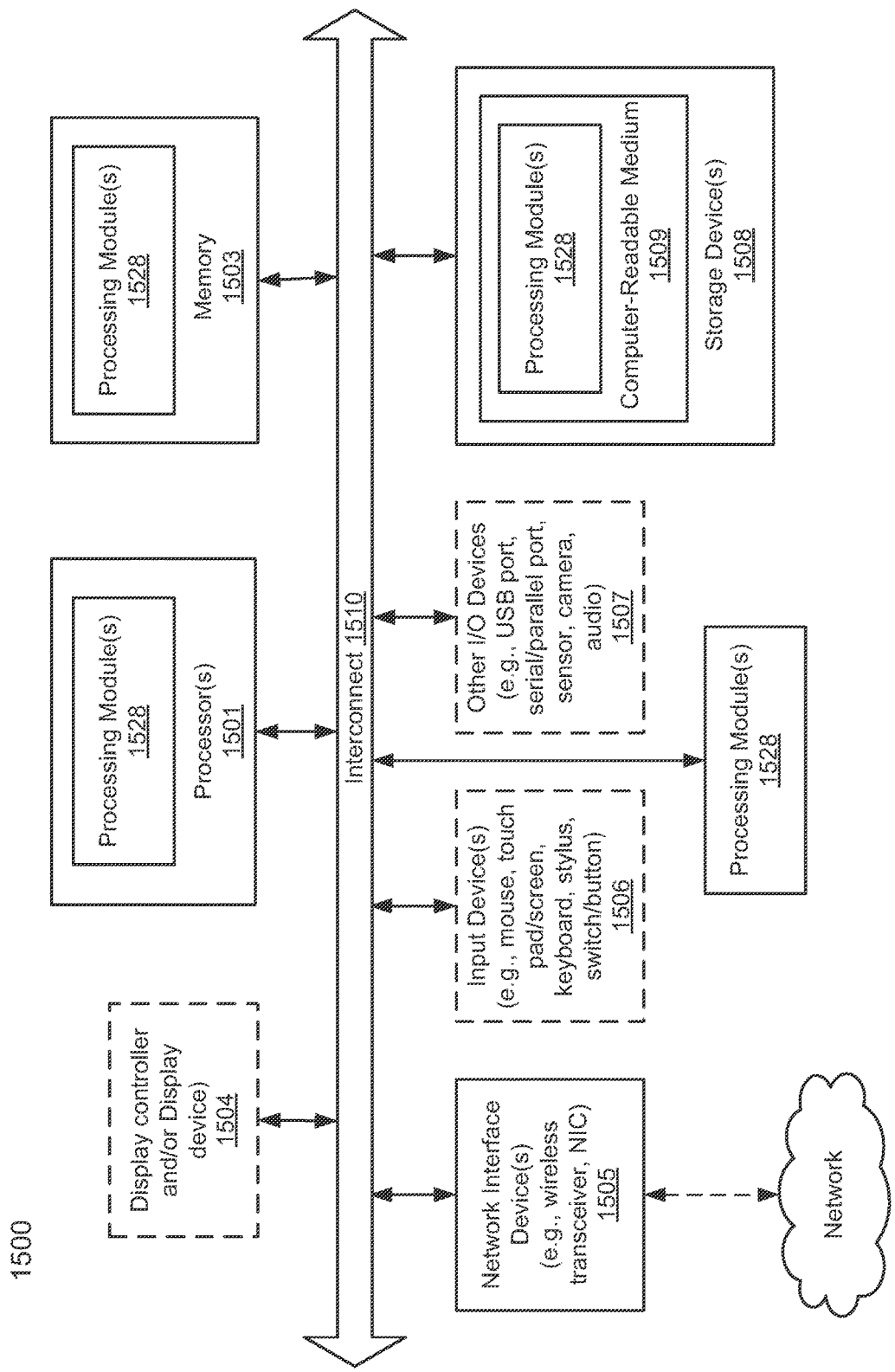
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and/or control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/ logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   determining a state difference between a current state of the ADV and a target state of the ADV while the ADV is moving along a route as planned;
   determining a state trend of current state in view of a previous state of the ADV, the state trend representing a trend of changes of a difference between the current state and the previous state;
   calculating a replanning score based on the state difference and the state trend;
   in response to determining that the replanning score is greater than a predetermined threshold, performing replanning for a next route segment of the route; and
   controlling one or more operations of the ADV based on the replanning.

2. The method of claim 1, further comprising performing regular planning for the next route segment of the route, in response to determining that the replanning score is below or equal to the predetermined threshold.

3. The method of claim 2, wherein the replanning is to plan the next route segment of the route based on the current state of the ADV, and wherein the regular planning is to plan the next route segment of the route based on the target state of the ADV.

4. The method of claim 1, further comprising:
   determining a current speed of the ADV; and
   determining a curvature of the next route segment, wherein the replanning score is calculated further based on the current speed of the ADV and the curvature of the next route segment.

5. The method of claim 1, wherein determining a state difference between a current state of the ADV and a target state of the ADV comprises:
   determining a distance difference between a current position of the ADV and a target position of the ADV; and determining a speed difference between a current speed of the ADV and a target speed of the ADV, wherein the state difference is calculated based on the distance difference and the speed difference.

6. The method of claim 5, wherein determining a state trend of current state in view of a previous state of the ADV comprises:
   determining a distance difference trend of the distance difference in view of a prior distance difference of a prior planning cycle; and
   determining a speed difference trend of the speed difference in view of a prior speed difference of the prior planning cycle, wherein the state trend is calculated based on the distance difference trend and the speed difference trend.

7. The method of claim 5, further comprising determining a direction difference between a current heading direction of the ADV and a target heading direction of the ADV, wherein the state difference is calculated further based on the direction difference.

8. The method of claim 7, further comprising determining a direction difference trend of the direction difference in view of a prior direction difference of the prior planning cycle, wherein the state trend is calculated based on the distance difference trend, the speed difference trend, and the direction difference trend.

9. A non-transitory machine-readable medium having instructions stored therein, which when executed by a processor, cause the processor to perform operations, the operations comprising:
   determining a state difference between a current state of the ADV and a target state of the ADV while the ADV is moving along a route as planned;
   determining a state trend of current state in view of a previous state of the ADV, the state trend representing a trend of changes of a difference between the current state and the previous state;
   calculating a replanning score based on the state difference and the state trend;
   in response to determining that the replanning score is greater than a predetermined threshold, performing replanning for a next route segment of the route; and
   controlling one or more operations of the ADV based on the replanning.

10. The machine-readable medium of claim 9, wherein the operations further comprise performing regular planning for the next route segment of the route, in response to determining that the replanning score is below or equal to the predetermined threshold.

11. The machine-readable medium of claim 10, wherein the replanning is to plan the next route segment of the route based on the current state of the ADV, and wherein the regular planning is to plan the next route segment of the route based on the target state of the ADV.

12. The machine-readable medium of claim 9, wherein the operations further comprise:
   determining a current speed of the ADV; and
   determining a curvature of the next route segment, wherein the replanning score is calculated further based on the current speed of the ADV and the curvature of the next route segment.

13. The machine-readable medium of claim 9, wherein determining a state difference between a current state of the ADV and a target state of the ADV comprises:
   determining a distance difference between a current position of the ADV and a target position of the ADV; and
   determining a speed difference between a current speed of the ADV and a target speed of the ADV, wherein the state difference is calculated based on the distance difference and the speed difference.

14. The machine-readable medium of claim 13, wherein determining a state trend of current state in view of a previous state of the ADV comprises:
   determining a distance difference trend of the distance difference in view of a prior distance difference of a prior planning cycle; and
   determining a speed difference trend of the speed difference in view of a prior speed difference of the prior planning cycle, wherein the state trend is calculated based on the distance difference trend and the speed difference trend.

15. The machine-readable medium of claim 13, wherein the operations further comprise determining a direction difference between a current heading direction of the ADV and a target heading direction of the ADV, wherein the state difference is calculated further based on the direction difference.

16. The machine-readable medium of claim 15, wherein the operations further comprise determining a direction difference trend of the direction difference in view of a prior direction difference of the prior planning cycle, wherein the state trend is calculated based on the distance difference trend, the speed difference trend, and the direction difference trend.

17. A data processing system, comprising:
   a processor; and
   a memory coupled to the processor to store instructions, which when executed by the processor, cause the processor to perform operations, the operations including
   determining a state difference between a current state of the ADV and a target state of the ADV while the ADV is moving along a route as planned,
   determining a state trend of current state in view of a previous state of the ADV, the state trend representing a trend of changes of a difference between the current state and the previous state,
   calculating a replanning score based on the state difference and the state trend,
   in response to determining that the replanning score is greater than a predetermined threshold, performing replanning for a next route segment of the route; and
   controlling one or more operations of the ADV based on the replanning.

18. The system of claim 17, wherein the operations further comprise performing regular planning for the next route segment of the route, in response to determining that the replanning score is below or equal to the predetermined threshold.

19. The system of claim 18, wherein the replanning is to plan the next route segment of the route based on the current state of the ADV, and wherein the regular planning is to plan the next route segment of the route based on the target state of the ADV.

20. The system of claim 17, wherein the operations further comprise:
   determining a current speed of the ADV; and
   determining a curvature of the next route segment, wherein the replanning score is calculated further based on the current speed of the ADV and the curvature of the next route segment.

21. The system of claim 17, wherein determining a state difference between a current state of the ADV and a target state of the ADV comprises:
- determining a distance difference between a current position of the ADV and a target position of the ADV; and
- determining a speed difference between a current speed of the ADV and a target speed of the ADV, wherein the state difference is calculated based on the distance difference and the speed difference.

22. The system of claim 21, wherein determining a state trend of current state in view of a previous state of the ADV comprises:
- determining a distance difference trend of the distance difference in view of a prior distance difference of a prior planning cycle; and
- determining a speed difference trend of the speed difference in view of a prior speed difference of the prior planning cycle, wherein the state trend is calculated based on the distance difference trend and the speed difference trend.

23. The system of claim 21, wherein the operations further comprise determining a direction difference between a current heading direction of the ADV and a target heading direction of the ADV, wherein the state difference is calculated further based on the direction difference.

24. The system of claim 23, wherein the operations further comprise determining a direction difference trend of the direction difference in view of a prior direction difference of the prior planning cycle, wherein the state trend is calculated based on the distance difference trend, the speed difference trend, and the direction difference trend.

* * * * *